(12) United States Patent
Ashibe

(10) Patent No.: US 6,201,606 B1
(45) Date of Patent: Mar. 13, 2001

(54) METHOD AND APPARATUS FOR PROCESSING SPECTRUM IN SPECTRAL MEASUREMENT

(75) Inventor: Emi Ashibe, Kyoto (JP)

(73) Assignee: Kyoto Daiichi Kagaku Co., Ltd., Kyoto (JP)

( * ) Notice: Subject to any disclaimer, the term of this patent is extended or adjusted under 35 U.S.C. 154(b) by 0 days.

(21) Appl. No.: 09/068,036

(22) PCT Filed: Oct. 31, 1996

(86) PCT No.: PCT/JP96/03192

§ 371 Date: Jul. 7, 1998

§ 102(e) Date: Jul. 7, 1998

(87) PCT Pub. No.: WO97/17596

PCT Pub. Date: May 15, 1997

(30) Foreign Application Priority Data

Nov. 8, 1995 (JP) .................................................. 7-324988

(51) Int. Cl.[7] .................................................. G01N 21/00

(52) U.S. Cl. ............................. 356/432; 356/436; 356/39

(58) Field of Search .............................. 356/39–41, 300, 356/320, 436–437, 432, 326, 328, 330–334, 319; 128/633; 250/339.04, 339.07

(56) References Cited

U.S. PATENT DOCUMENTS

| 4,559,557 | * | 12/1985 | Keyes et al. . |
| 4,805,623 | | 2/1989 | Jöbsis . |
| 4,830,014 | | 5/1989 | Goodman et al. . |
| 4,883,963 | | 11/1989 | Kemeny et al. . |
| 5,039,855 | | 8/1991 | Kemeny et al. ............... 250/339.07 |
| 5,224,478 | | 7/1993 | Sakai et al. . |
| 5,226,417 | | 7/1993 | Swedlow et al. . |
| 5,435,309 | * | 7/1995 | Thomas et al. . |
| 5,444,528 | | 8/1995 | Puschell . |
| 5,475,221 | | 12/1995 | Wang . |
| 5,477,321 | | 12/1995 | Johnson . |
| 5,598,842 | | 2/1997 | Ishihara et al. . |
| 5,879,373 | | 3/1999 | Röper et al. . |

FOREIGN PATENT DOCUMENTS

| 0 374 190 B1 | 6/1990 | (EP) . |
| 0 641 542 A2 | 3/1995 | (EP) . |
| 0 722 691 A1 | 7/1996 | (EP) . |

(List continued on next page.)

OTHER PUBLICATIONS

Dialog File 347 (JPAIO) English Language Patent Abstract for JP 5–317295 A, published Dec. 3, 1993, p. 1.

Dialog File 347 (JAPIO) English Language Patent Abstract for JP 7–329971 A, published Dec. 19, 1995, p. 1.

Japanese Patent Office, "Patent Abstracts of Japan", Abstract for JP Patent Publication No. 62185126 A, published Aug. 13, 1987, p. 1.

Japanese Patent Office, "Patent Abstracts of Japan", Abstract for JP Patent Publication No. 63171329 A, published Jul. 15, 1988, p. 1.

Japanese Patent Office, "Patent Abstracts of Japan", Abstract for JP Patent Publication No. 62172777 A, published Jul. 29, 1987, p. 1.

Japanese Patent Office, "Patent Abstracts of Japan", Abstract for JP Patent Publication No. 01316724 A, published Dec. 21, 1989, p. 1.

(List continued on next page.)

*Primary Examiner*—Hoa Q. Pham
(74) *Attorney, Agent, or Firm*—Sterne, Kessler, Goldstein & Fox, PLLC

(57) ABSTRACT

The apparatus for processing a spectrum in spectral measurement includes: a measurement section 10 for measuring an energy spectrum of light for measurement from an object to be measured; an addition section 11 for adding a predetermined value to the energy spectrum of the light for measurement; and a conversion section 12 for obtaining an absorbance spectrum with reduced noise by effecting absorbance conversion of the energy spectrum of the light for measurement with the addition of the predetermined value.

6 Claims, 6 Drawing Sheets

FOREIGN PATENT DOCUMENTS

| | | |
|---|---|---|
| 54-77491 | 6/1979 | (JP) . |
| 60-207020 | 10/1985 | (JP) . |
| 61-163602 | 7/1986 | (JP) . |
| 61-165519 | 10/1986 | (JP) . |
| 62-123526 | 8/1987 | (JP) . |
| 62-185126 | 8/1987 | (JP) . |
| 63-171329 | 7/1988 | (JP) . |
| 1-316724 | 12/1989 | (JP) . |
| 2-24102 | 7/1990 | (JP) . |
| 3-500207 | 1/1991 | (JP) . |
| 3-138537 | 6/1991 | (JP) . |
| 4-76517 | 12/1992 | (JP) . |
| 6-201468 | 7/1994 | (JP) . |
| 7-55565 | 3/1995 | (JP) . |
| 5-317295 | 12/1995 | (JP) . |
| 7-329971 | 12/1995 | (JP) . |
| 8-178751 | 7/1996 | (JP) . |
| 8-215180 | 8/1996 | (JP) . |
| WO 89/01758 | 3/1989 | (WO) . |

OTHER PUBLICATIONS

Japanese Patent Office, "Patent Abstracts of Japan", Abstract for JP Patent Publication No. 06201468 A, published Jul. 19, 1994, p. 1.

Japanese Patent Office, "Patent Abstracts of Japan", Abstract for JP Patent Publication No. 03138537 A, published Jun. 12, 1991, p. 1.

Dialog File 348 (EPO) English Language Patent Abstract for EP 722691 A1, published Jul. 24, 1996, p. 1.

* cited by examiner

METHOD AND APPARATUS FOR PROCESSING SPECTRUM IN SPECTRAL MEASUREMENT

TECHNICAL FIELD

The present invention relates to a method and an apparatus for processing a spectrum of transmitted light or reflected light obtained by projecting light on an object to be measured by spectral measurement.

BACKGROUND ART

Noise exists in an energy spectrum obtained in spectral measurement irrespective of the measured energy value. For a wavelength where the energy level is relatively close to noise due to the optical characteristics of a light source, the sensitivity characteristics of a detector, a high absorption of an object to be measured, or the like, the noise is greatly amplified when the energy spectrum is converted into an absorbance spectrum. As a result, the noise becomes greater than the original absorption information, causing the inconvenience of failing to provide a correct quantitative analysis.

The existence of noise greater than the original absorption information is also inconvenient for the processing of the absorbance spectrum. The reason is that the large amount of noise makes it impossible to use an automatic axial alignment function, for example, which is inconvenient.

In multivariate analysis, measured values for multiple wavelengths are used for calculation. In such calculation, also, the existence of large amounts of noise is inconvenient. The reason is that the large amounts of noise makes it impossible to perform correct quantitative analysis.

Conventionally, in spectral measurement, a multi-scanning averaging method and a moving average smoothing method are known as methods for reducing noise included in a spectrum. Quantitative analysis is not conventionally available for a wavelength having an excessively large amount of noise.

In spectral measurement, noise included in an energy spectrum is substantially constant irrespective of the energy value. However, noise included in an absorbance spectrum becomes greater as the original energy level becomes smaller.

In the multi-scanning averaging method, it takes a considerably long time to obtain absorption information. Moreover, the level of noise reduction is limited.

In the moving average smoothing method, it is impossible to reduce noise greater than the original absorption information. Moreover, there is even a possibility of deleting absorption information in a wavelength range where noise is small.

The object of the present invention is to provide a method and an apparatus capable of reducing noise included in an absorbance spectrum in spectral measurement.

SUMMARY OF THE INVENTION

The method of the present invention is a method for processing a spectrum in spectral measurement, including the steps of: measuring an energy spectrum of light for measurement from an object to be measured; adding a predetermined value to the energy spectrum of the light for measurement; and obtaining an absorbance spectrum with reduced noise by effecting absorbance conversion of the energy spectrum of the light for measurement with the addition of the predetermined value, whereby the above object is attained.

The predetermined value may be variable for a wavelength range of the energy spectrum of the light for measurement.

The method may further include the step of conducting quantitative analysis of a component contained in the object to be measured based on the absorbance spectrum with reduced noise.

The quantitative analysis may be conducted based on a multivariate analysis method.

The apparatus of the present invention is an apparatus for processing a spectrum in spectral measurement, including: a measurement section for measuring an energy spectrum of light for measurement from an object to be measured; an addition section for adding a predetermined value to the energy spectrum of the light for measurement; and a conversion section for obtaining an absorbance spectrum with reduced noise by effecting absorbance conversion of the energy spectrum of the light for measurement with the addition of the predetermined value, whereby the above object is attained.

The predetermined value may be variable for a wavelength range of the energy spectrum of the light for measurement.

The apparatus may further include a quantitative analysis section for conducting quantitative analysis of a component contained in the object to be measured based on the absorbance spectrum with reduced noise.

The quantitative analysis may be conducted based on a multivariate analysis method.

Hereinbelow, the function will be described.

According to the present invention, an absorbance spectrum with reduced noise can be obtained by adding a predetermined value or a predetermined spectrum to the energy spectrum of light for measurement and converting the energy spectrum of the light for measurement with the addition of the predetermined value or the predetermined spectrum into the absorbance spectrum.

The precision of quantitative analysis can be improved by conducting the quantitative analysis using the absorbance spectrum with reduced noise.

DETAILED DESCRIPTION OF THE PREFERRED EMBODIMENTS

Hereinbelow, an embodiment of the present invention will be described with reference to the accompanying drawings.

Figure 1:
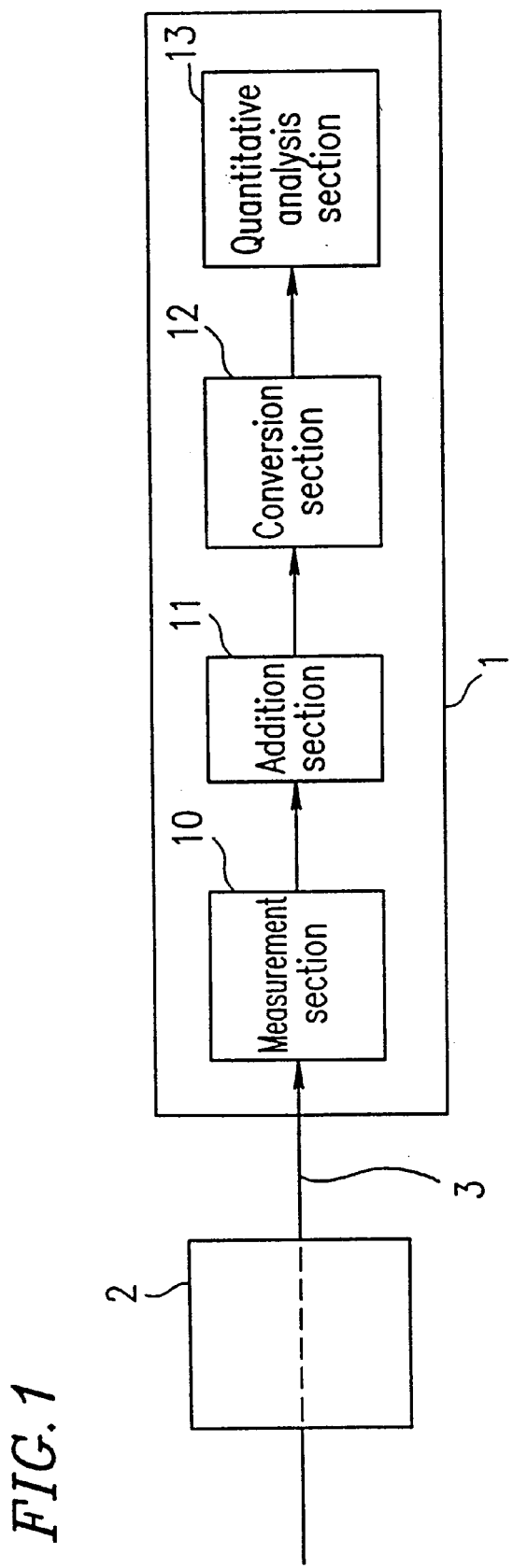
FIG. 1 is a view illustrating a configuration of an optical apparatus 1 according to the present invention.

FIG. 1 shows a configuration of an optical apparatus 1 according to the present invention. The apparatus 1 conducts quantitative analysis using a noise-reduced absorbance spectrum. The apparatus 1 includes a measurement section 10, an addition section 11, a conversion section 12, and a quantitative analysis section 13.

The measurement section 10 receives transmitted light or reflected light (i.e., light for measurement 3) which is obtained by projecting light on an object 2 to be measured. The measurement section 10 measures the energy spectrum of the light for measurement 3. The energy spectrum measured by the measurement section 10 is output to the addition section 11.

The addition section 11 adds a predetermined value or a predetermined spectrum to the energy spectrum measured by the measurement section 10. The energy spectrum with the addition of the predetermined value or the predetermined spectrum is output to the conversion section 12.

The conversion section 12 converts the energy spectrum with the addition of the predetermined value or the predetermined spectrum into an absorbance spectrum, so as to obtain a noise-reduced absorbance spectrum. The noise-reduced absorbance spectrum obtained by the conversion section 12 is output to the quantitative analysis section 13.

The quantitative analysis section 13 conducts quantitative analysis of components contained in the object to be measured by use of the noise-reduced absorbance spectrum. For example, the quantitative analysis section 13 conducts the quantitative analysis of components contained in the object to be measured by conducting multivariate analysis for the noise-reduced absorbance spectrum.

Hereinbelow, the principle for obtaining the noise-reduced absorption spectrum by effecting absorbance conversion of the energy spectrum with the addition of a predetermined value or a predetermined spectrum will be described.

According to the Lambert-Beer's law, the absorbance is represented by (expression 1).

$$A = -\log(I/I_0) \quad \text{(expression 1)}$$

wherein

A: absorbance,

I: intensity of light for measurement $I_0$: intensity of incident light.

In actual measurement, however, both the intensity I of light for measurement and the intensity $I_0$ of incident light include noise.

Assume that both an ideal intensity $I(\lambda)$ of light for measurement and an ideal intensity $I_0(\lambda)$ of incident light include a noise $\pm K$. In this case, an absorbance $A(\lambda)$ for a wavelength $\lambda$ is represented by (expression 2):

$$A(\lambda) = -\log((I(\lambda) \pm K)/(I_0(\lambda) \pm K)) \quad \text{(expression 2)}$$

If the intensity $I_0(\lambda)$ of incident light is sufficiently larger than the noise $\pm K$, (expression 3) is satisfied.

$$I_0(\lambda) \approx I_0(\lambda) \pm K \quad \text{(expression 3)}$$

When the noise $\pm K$ is represented using an arbitrary coefficient k as being k times as large as the ideal intensity $I(\lambda)$ of light for measurement, (expression 4) is satisfied.

$$\pm K = \pm k \cdot I(\lambda) \quad \text{(expression 4)}$$

From (expressions 3) and (expression 4), (expression 2) is transformed into (expression 5):

$$A(\lambda) \approx -\log((I(\lambda) \pm k \cdot I(\lambda))/I_0(\lambda)) = -\log((I(\lambda) \cdot (1 \pm k))/I_0(\lambda)) = -\log(I(\lambda)/I_0(\lambda)) - \log(1 \pm k) \quad \text{(expression 5)}$$

From (expressions 1) and (expression 5), it is found that a noise $-\log(1 \pm k)$ is included in the absorbance $A(\lambda)$.

When the noise is sufficiently smaller than the ideal intensity $I(\lambda)$ of light for measurement, (expression 6) is satisfied. In this case, the width of the noise included in the absorbance $A(\lambda)$ is almost zero (see (expression 7)). Therefore, when the noise is sufficiently smaller than the ideal intensity $I(\lambda)$ of light for measurement, the noise little affects the absorbance $A(\lambda)$.

$$k << 1 (k \geq 0) \quad \text{(expression 6)}$$

$$lim\{-log(1-k)-(-log(1+k))\}k \to 0 \approx log1 - log1 = 0 \quad \text{(expression 7)}$$

On the contrary, when the noise is almost as great as the ideal intensity $I(\lambda)$ of light for measurement, expression (8) is satisfied. In this case, the width of the noise included in the absorbance $A(\lambda)$ is infinitely large (see (expression 9)). Therefore, when the noise is almost as great as the ideal intensity $I(\lambda)$ of light for measurement, it greatly affects the absorbance $A(\lambda)$.

$$k \approx 1 \quad \text{(expression 8)}$$

$$lim\{-log(1-k)-(-log(1+k))\}k \to 1 \approx log0 - log2 \to -\infty \quad \text{(expression 9)}$$

When a fixed value N is added to the intensity $I(\lambda)$ of light for measurement, (expression 2) is transformed into (expression 10).

$$A(\lambda) = -\log((I(\lambda) \pm K + N)/(I_0(\lambda) \pm K + N)) \quad \text{(expression 10)}$$

If the intensity $I_0(\lambda)$ of incident light is sufficiently larger than the noise $\pm K$ and the fixed value N, (expression 11) is satisfied.

$$I_0(\lambda) \approx I_0(\lambda) \pm K + N \quad \text{(expression 11)}$$

When the fixed value N is represented using an arbitrary coefficient n as being n times as large as the ideal intensity $I(\lambda)$ of light for measurement, (expression 12) is satisfied.

$$N = n \cdot I(\lambda) \quad \text{(expression 12)}$$

From (expression 4), (expression 11), and (expression 12), (expression 10) is transformed into (expression 13):

$$A(\lambda) \approx -\log((I(\lambda) \pm k \cdot I(\lambda) \pm n \cdot I(\lambda))/I_0(\lambda)) = -\log((I(\lambda) \cdot (1 \pm k + n))/I_0(\lambda)) = -\log(I(\lambda)/I_0(\lambda)) - \log(1 \pm k + n) \quad \text{(expression 13)}$$

By adding the fixed value N to the intensity $I(\lambda)$ of light for measurement, the width of the noise included in the absorbance $A(\lambda)$ is converged to a fixed value ($\log(n/(2+n))$) even if the noise is almost as great as the ideal intensity $I(\lambda)$ of light for measurement (see (expression 14)). In this way, the influence of the noise on the absorbance $A(\lambda)$ can be reduced.

$$lim\{-log(1+k+n)-(-log(1-k+n))\}k \to 1 \approx -log(2+n) + logn = log(n/(2+n)) \quad \text{(expressions 14)}$$

It is observed from (expression 14) that, as the fixed value N becomes larger (i.e., the fixed value n becomes larger), the width of the noise included in the absorbance $A(\lambda)$ becomes smaller. However, as the fixed value N becomes larger, the linearity of the correlation between the concentration of the object to be measured and the absorbance deteriorates. Therefore, the fixed value N is preferably selected appropriately so that the linearity of the correlation between the concentration of the object to be measured and the absorbance does not greatly deteriorate.

Thus, the fixed value N is determined to be more than the value required to reduce the noise below a target amount and less than the value at which the linearity of the correlation between the concentration of the object to be measured and the absorbance greatly deteriorates. For example, the fixed value N is equal to or more than a noise variation width in the energy spectrum. Especially, the fixed value N is desirably equal to or more than about 10 times the noise variation width in the energy spectrum. Alternatively, the fixed value N may be a value set so that an analytical curve regression error after noise reduction is equal to or less than twice the analytical curve regression error before the noise reduction, desirably equal to or less than the analytical curve regression error before the noise reduction.

When the fixed value N is within the above range and the range of the variation in the absorbance of the object to be measured is restricted to a small range, the linearity of the correlation between the concentration of the object to be measured, and the absorbance may be approximately linear.

In the illustrated embodiment, the fixed value N is added to the energy spectrum of the light for measurement regardless of the wavelength range of the energy spectrum of the light for measurement. Alternatively, instead of the fixed value N, a predetermined spectrum of which value is varied depending on the wavelength range, may be added to the energy spectrum of the light for measurement. For example, the value N may be added to the energy spectrum of the light for measurement for a specified wavelength range, while the value N may not be added to the energy spectrum of the light for measurement for the wavelength ranges other than the specified wavelength range. Examples of such a specified wavelength range include the wavelength range where the energy level of the light for measurement is substantially close to zero, the wavelength range where the dispersion in the absorbance spectrum is substantially equal to or more than the dispersion in the absorbance due to a variation in the concentration of a target component, and the wavelength range where the analytical curve regression error after noise reduction is equal to or less than twice the analytical curve regression error before the noise reduction, desirably equal to or less than the analytical curve regression error before the noise reduction.

Hereinbelow, the effect of the reduction of noise by the apparatus 1 will be specifically described.

Figure 2:
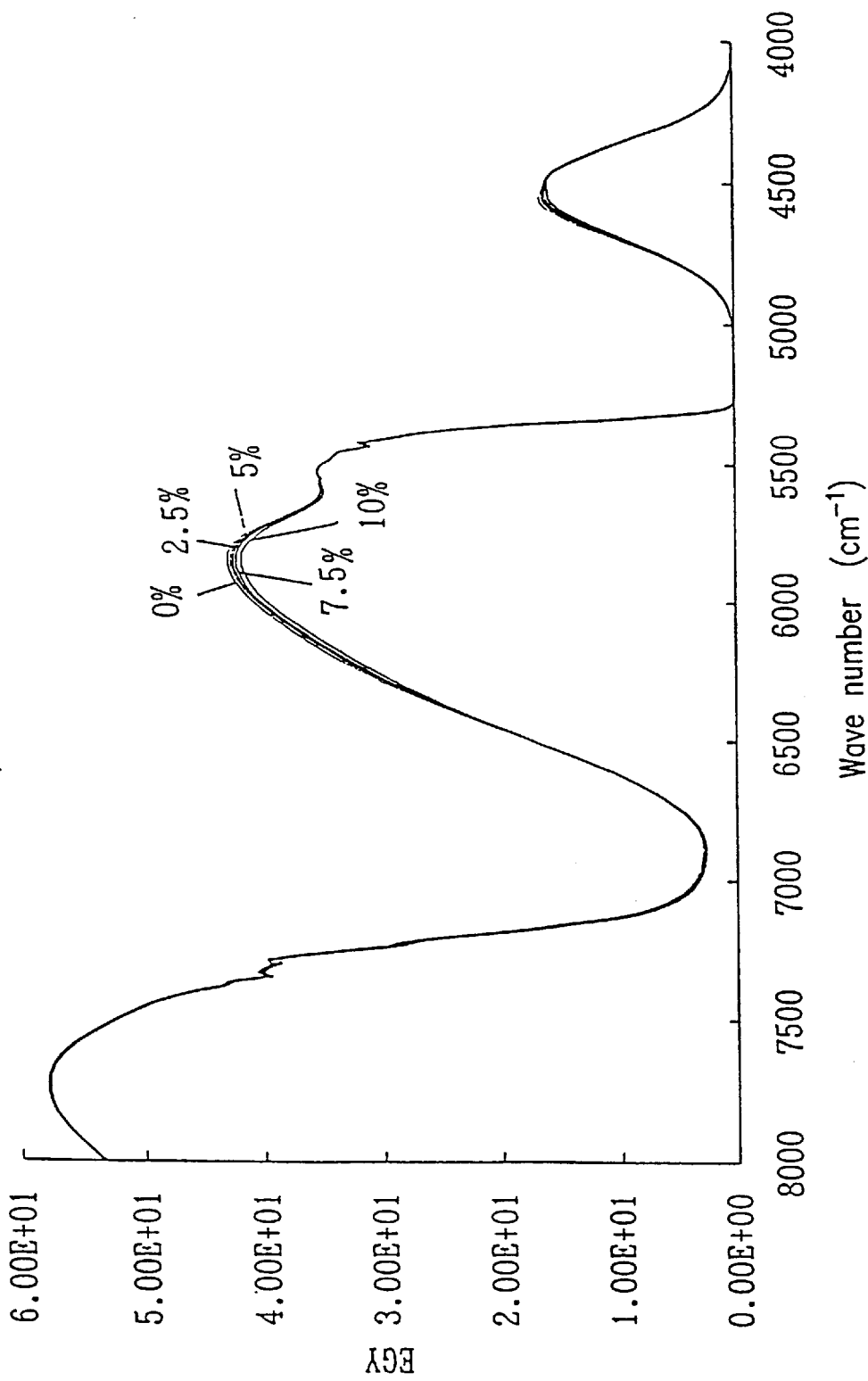
FIG. 2 is a view illustrating transmission energy spectra of aqueous glucose solutions.

FIG. 2 illustrates the transmission energy spectra of aqueous glucose solutions with concentrations of 0%, 2.5%, 5%, 7.5%, and 10% for the wavelength range corresponding to 8000 to 4000 $cm^{-1}$.

Figure 3:
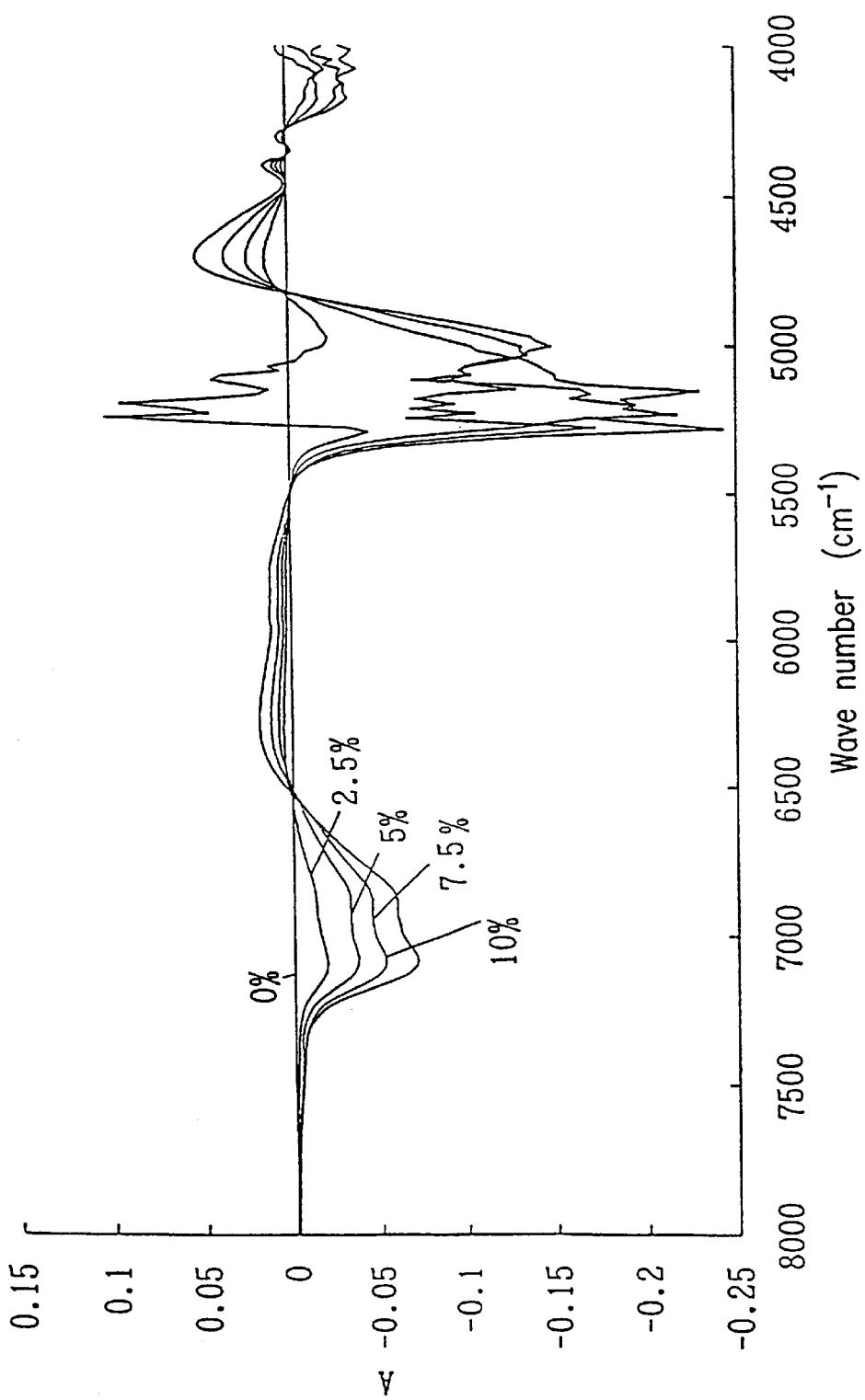
FIG. 3 is a view illustrating the difference between the absorbance spectra before spectrum processing and the absorbance spectrum corresponding to the glucose concentration of 0%.

FIG. 3 illustrates the difference between the absorbance spectra obtained by effecting absorbance conversion of the transmission energy spectra shown in FIG. 2 and the absorbance spectrum corresponding to the glucose concentration of 0%.

Figure 4:
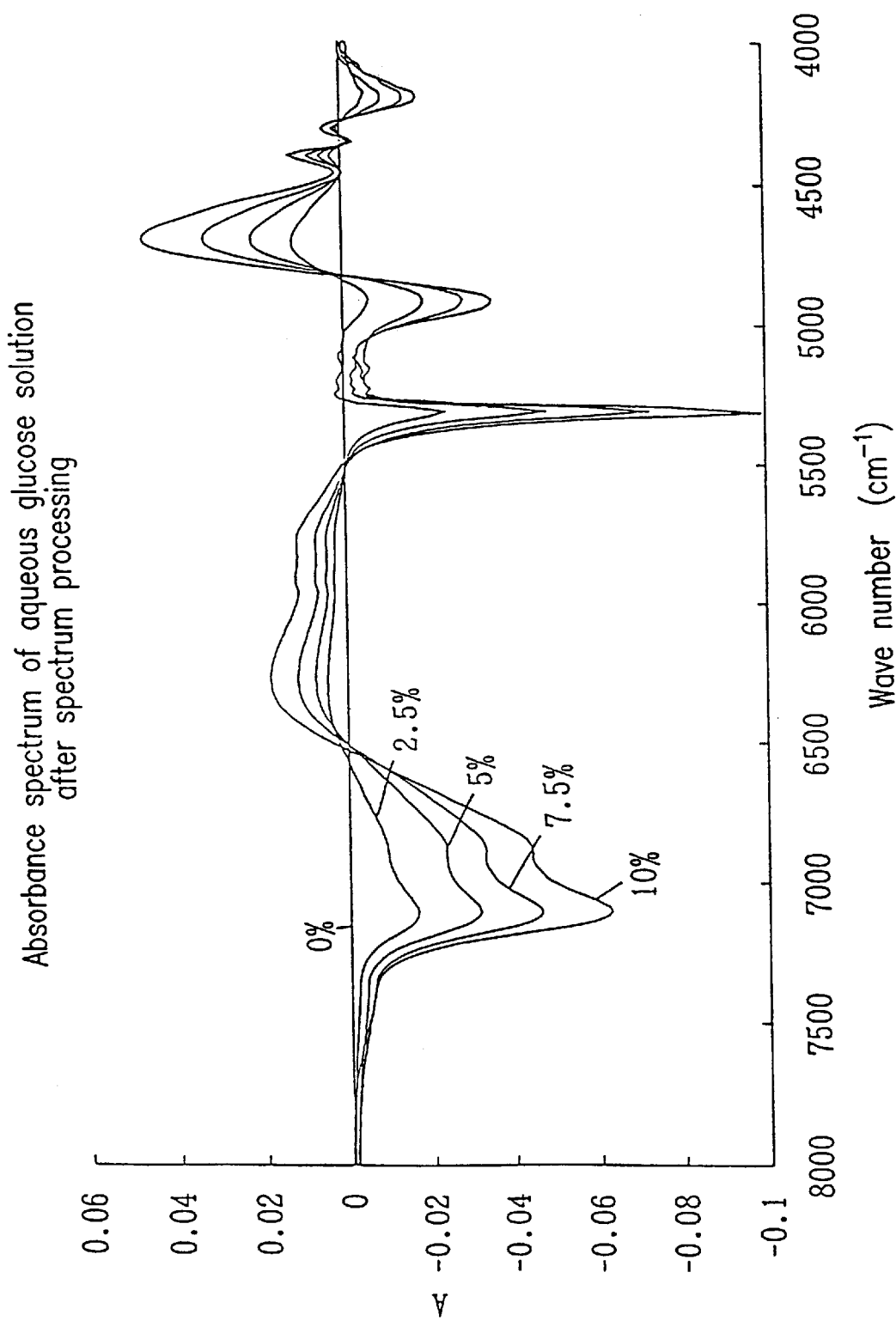
FIG. 4 is a view illustrating the difference between the absorbance spectra after spectrum processing and the absorbance spectrum corresponding to the glucose concentration of 0%.

FIG. 4 illustrates the difference between the absorbance spectra obtained by adding a fixed value of 1.0 to the transmission energy spectra shown in FIG. 2 and effecting absorbance conversion of the 1.0-added transmission energy spectra and the absorbance spectrum corresponding to the glucose concentration of 0%. Herein, the addition of the fixed value of 1.0 to the transmission energy spectrum shown in FIG. 2 is referred to as the "spectrum processing".

The transmission energy spectra shown in FIG. 2 have extremely small energy levels in the wavelength ranges corresponding to 5300 to 5000 $cm^{-1}$ and 4100 to 4000 $cm^{-1}$. This is because water absorption is large in these wavelength ranges.

An extremely large amount of noise is exhibited in these wavelength ranges in the absorption spectra shown in FIG. 3. On the contrary, little noise is exhibited in these wavelength ranges in the absorption spectra shown in FIG. 4.

Figure 5:
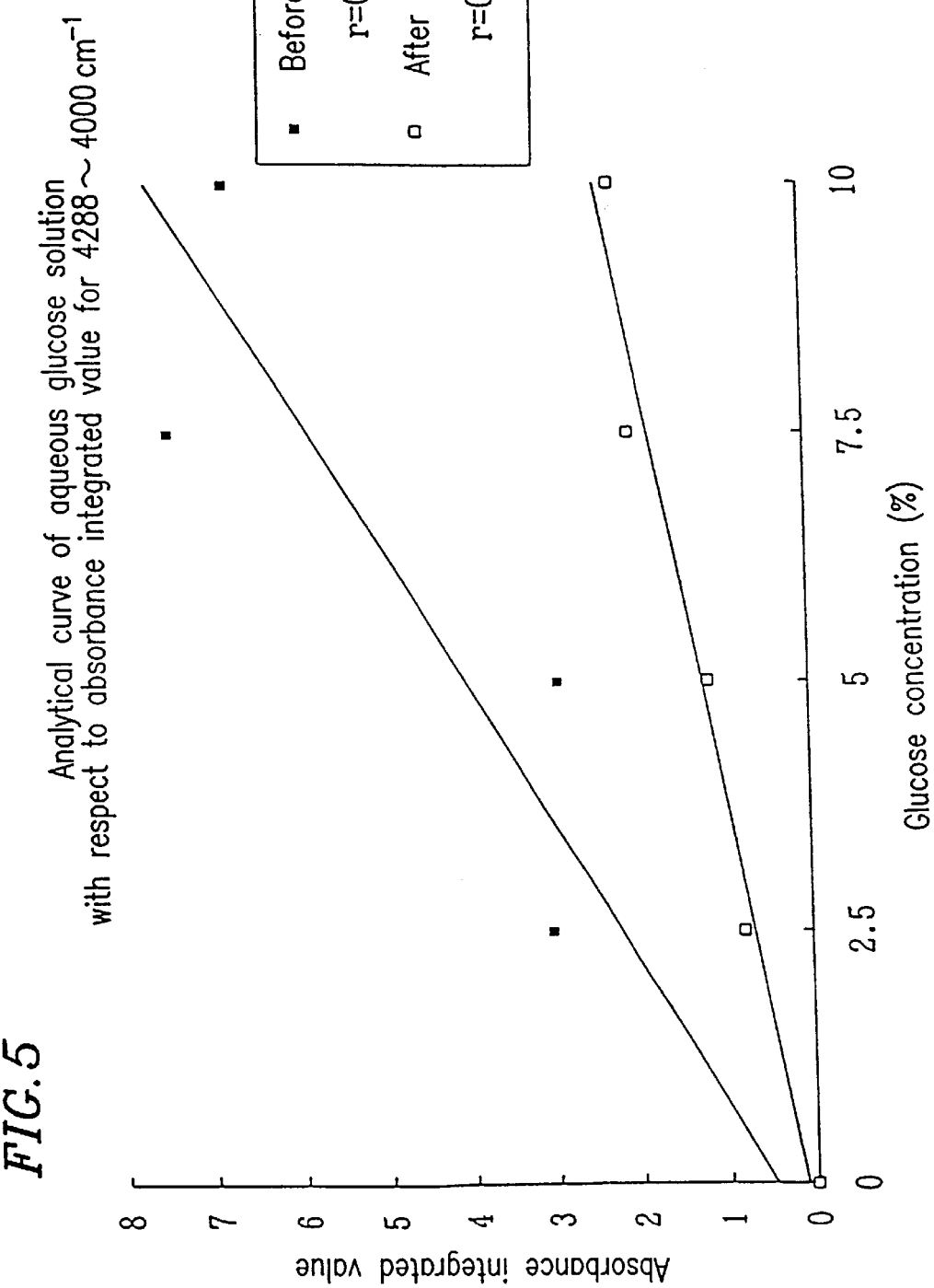
FIG. 5 is a view illustrating the analytical curves of the absorbance integrated values of the aqueous glucose solutions for wavelengths corresponding to 4288 to 4000 $cm^{-1}$ with respect to the glucose concentrations.

FIG. 5 illustrates the analytical curves of the absorbance integrated values for the wavelengths corresponding to 4288 to 4000 $cm^{-1}$ with respect to the glucose concentrations, for the absorbance spectra before the spectrum processing (FIG. 3) and the absorbance spectra after the spectrum processing (FIG. 4).

The correlation (r) between the absorbance integrated value and the glucose concentration for the absorbance spectra before the spectrum processing is 0.924431, while the correlation (r) between the absorbance integrated value and the glucose concentration for the absorbance spectra after the spectrum processing is 0.982478. It is observed from FIG. 5 that both the correlation and the variation have been improved.

Figure 6:
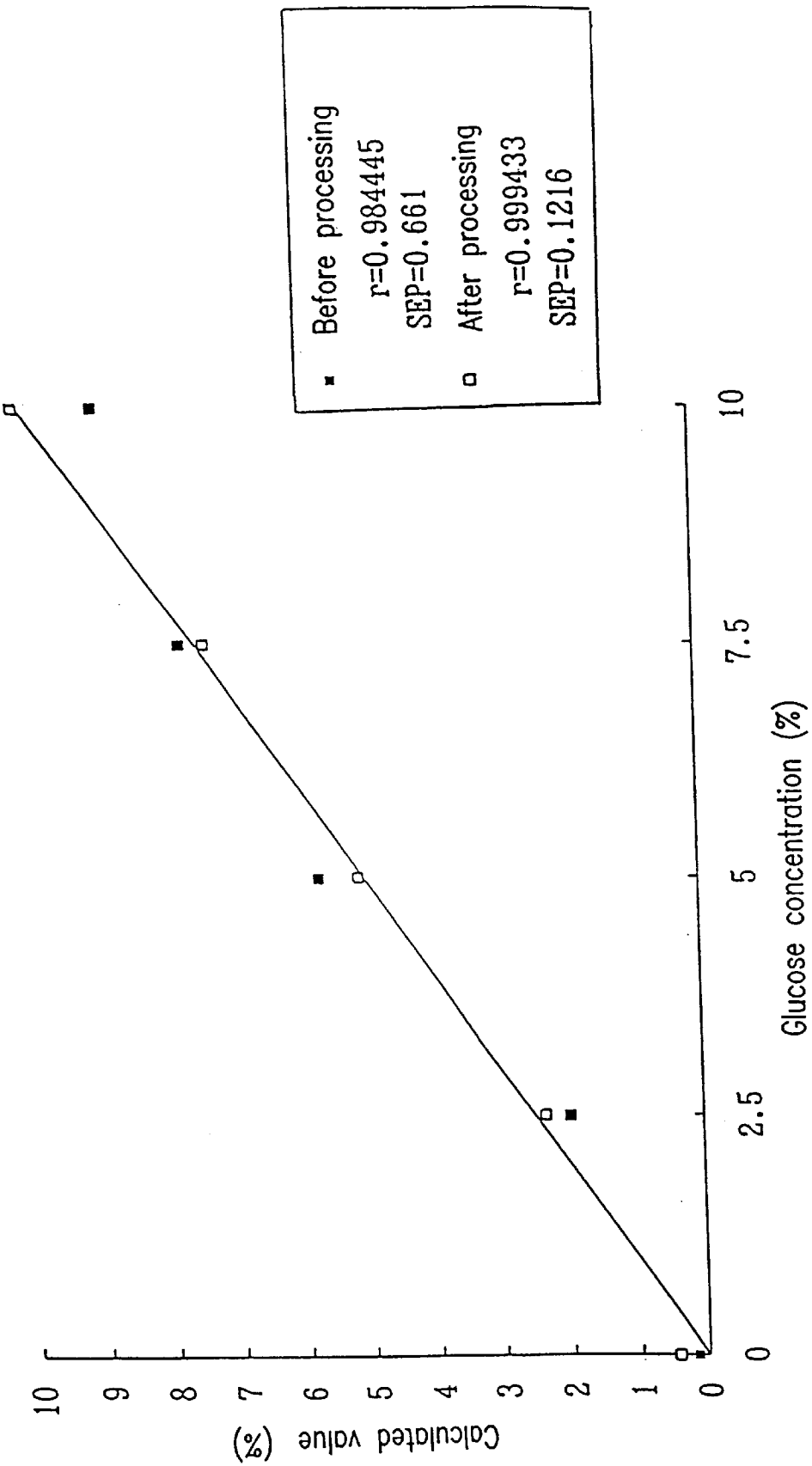
FIG. 6 is a view illustrating the results of quantitative analysis conducted based on a PCR multivariate analysis method.

FIG. 6 illustrates the results of the quantitative analysis conducted for the absorbance spectra before the spectrum processing (FIG. 3) and the absorbance spectra after the spectrum processing (FIG. 4) for the wavelengths corresponding to 8000 to 4000 $cm^{-1}$ based on the PCR (Principal Component Regression) multivariate analysis method.

For the absorbance spectra before the spectrum processing, the correlation (r) between the calculated value and the glucose concentration is 0.984445 and the SEP (Standard Error of Prediction) is 0.661. For the absorbance spectra after the spectrum processing, the correlation (r) between the calculated value and the glucose concentration is 0.999433 and the SEP (Standard Error of Prediction) is 0.1216. It is observed from FIG. 6 that both the correlation and the SEP (Standard Error of Prediction) have been improved by the spectrum processing.

Industrial Applicability

According to the present invention, a noise-reduced absorbance spectrum can be obtained by adding a predetermined value or a predetermined spectrum to the energy spectrum of light for measurement and converting the energy spectrum of the light for measurement with the addition of the predetermined value or the predetermined spectrum into the absorbance spectrum.

Accordingly, the processing of eliminating a wavelength which includes noise from the entire wavelengths during the processing of the absorbance spectrum is unnecessary. This facilitates the spectrum processing such as differential, smoothing, and area calculation, and makes it possible to use the automatic axial alignment function.

Using the absorbance spectrum with reduced noise, high-precision quantitative analysis is possible.

In the multivariate analysis, the processing of eliminating a wavelength which includes noise from all wavelengths is unnecessary. This allows for quantitative calculation for all wavelengths. This further enhances the precision and reliability of the quantitative analysis.

What is claimed is:

1. A method for processing a spectrum in spectral measurement, comprising the steps of:

measuring an energy spectrum of light for measurement from an object to be measured;

adding a predetermined value to the energy spectrum of the light for measurement; and obtaining an absorbance spectrum with reduced noise by effecting absorbance conversion of the energy spectrum of the light for measurement with the addition of the predetermined value, wherein the predetermined value is variable for a wavelength range of the energy spectrum of the light for measurement.

2. A method according to claim 1, further comprising the step of:

conducting quantitative analysis of a component contained in the object to be measured based on the absorbance spectrum with reduced noise.

3. A method according to claim 2, wherein the quantitative analysis is conducted based on a multivariate analysis method.

4. An apparatus for processing a spectrum in spectral measurement, comprising:

a measurement section for measuring an energy spectrum of light for measurement from an object to be measured;

an addition section for adding a predetermined value to the energy spectrum of the light for measurement; and a conversion section for obtaining an absorbance spectrum with reduced noise by effecting absorbance conversion of the energy spectrum of the light for measurement with the addition of the predetermined value, wherein the predetermined value is variable for a wavelength range of the energy spectrum of the light for measurement.

5. An apparatus according to claim 4, further comprising:

a quantitative analysis section for conducting quantitative analysis of a component contained in the object to be measured based on the absorbance spectrum with reduced noise.

6. An apparatus according to claim 5, wherein the quantitative analysis is conducted based on a multivariate analysis method.

* * * * *